United States Patent [19]
Scheffer

[11] Patent Number: 4,754,825
[45] Date of Patent: Jul. 5, 1988

[54] GAME SLED

[76] Inventor: Darrell J. Scheffer, 32765 S.E. Compton Rd., Boring, Oreg. 97009

[21] Appl. No.: 74,972

[22] Filed: Jul. 17, 1987

Related U.S. Application Data

[63] Continuation of Ser. No. 824,420, Jan. 31, 1986, abandoned.

[51] Int. Cl.[4] .......................... B66D 1/28; B66D 3/00
[52] U.S. Cl. ..................... 180/7.5; 104/173.2; 180/180; 254/323; 254/358; 254/380; 414/559
[58] Field of Search ................. 180/7.5, 313, 180; 414/559; 254/323, 358, 380; 104/173.2

[56] References Cited

U.S. PATENT DOCUMENTS

| | | | |
|---|---|---|---|
| 492,416 | 2/1893 | Munchweiler | 414/538 X |
| 719,372 | 1/1903 | Renger | 414/538 |
| 3,473,486 | 10/1969 | Harmon | 180/7.1 X |
| 3,692,119 | 9/1972 | Tucker | 180/14.1 X |
| 3,938,781 | 2/1976 | Craven et al. | 254/380 X |
| 4,233,098 | 11/1980 | Urbain | 156/242 |
| 4,444,375 | 4/1984 | Horn | 254/358 X |
| 4,552,340 | 11/1985 | Sheppard | 254/358 |

FOREIGN PATENT DOCUMENTS

| | | | |
|---|---|---|---|
| 2806125 | 8/1979 | Fed. Rep. of Germany | 254/323 |
| 58480 | 10/1937 | Norway | 280/19 |

Primary Examiner—John J. Love
Assistant Examiner—Mitchell J. Hill
Attorney, Agent, or Firm—Kolisch, Hartwell & Dickinson

[57] ABSTRACT

The game sled of the instant invention includes an elongate, game carrying box which has spaced apart, substantially parallel sides and a planar base. The forward end of the box is streamlined for easy movement over and around obstructions. The game sled is drawn over a surface by a powered winch which is mounted in the box and which includes a spool having a length of cable wound thereon. The cable is played off of the spool and attached to a fixed object. The winch is then used to draw the sled towards the fixed object. A cable is trained from the spool through a cable guide, located in a substantially V-shaped fairlead located at the front end of the box. The free ends of the fairlead are attached at the sides of the box such that the apex of the V, containing the cable guide, is vertically swingable to assist clearance of the box over and around obstacles as the sled is drawn over the surface.

18 Claims, 2 Drawing Sheets

GAME SLED

This is a continuation of application Ser. No. 824,420, filed Jan. 31, 1986 now abandoned.

BACKGROUND AND SUMMARY OF THE INVENTION

The instant invention relates to a game sled and specifically relates to a game sled having an obstruction-avoiding fairlead.

Frequently, the most difficult chore which a successful hunter is faced with is the act of moving the carcass of a dead game animal from the point of kill to the hunter's camp or vehicle. Although some forms of powered game sleds are known, known sleds do not provide for obstruction clearance and must be manually guided around and over obstacles, such as brush, downed trees, large rocks, etc., to prevent the sled from coming to a standstill.

An object of the instant invention is to provide a powered game sled which has a streamline forward end which will guide the sled about obstacles.

Another object of the instant invention is to provide a game sled which is drawn over a surface by a powered winch located in the sled.

Yet another object of the instant invention is to provide a game sled which has a fairlead operable with a cable used for drawing the sled over a surface which will act to guide the sled over and around obstacles.

A further object of the instant invention is to provide a game sled which is relatively inexpensive to construct and is easily repaired in the field.

Still another object of the instant invention is to provide a game sled which is easily loaded and unloaded.

A further object of the instant invention is to provide a game sled which has a bottom surface having a low coefficient of friction for easy sliding over the ground.

The game sled of the instant invention includes an elongate, game carrying box which has spaced apart, substantially parallel sides and a planar base. The forward end of the box is streamlined for easy movement over and around obstructions. The game sled is drawn over a surface by a powered winch which is mounted in the box and which includes a spool having a length of cable wound thereon. The cable is played off of the spool and attached to a fixed object. The winch is then used to draw the sled towards the fixed object. A cable is trained from the spool through a cable guide, located in a substantially V-shaped fairlead located at the front end of the box. The free ends of the fairlead are attached at the sides of the box such that the apex of the V, containing the cable guide, is vertically swingable to assist clearance of the box over and around obstacles as the sled is drawn over the surface.

These and other objects and advantages will become more fully apparent as the description which follows is read in conjunction with the attached drawings.

DETAILED DESCRIPTION OF A PREFERRED EMBODIMENT

Figure 1:
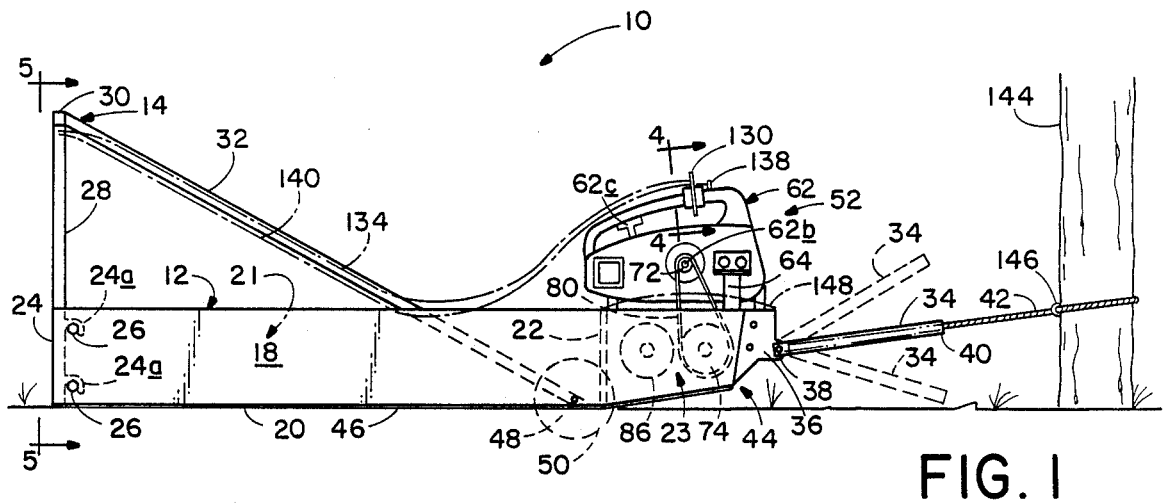
FIG. 1 is a side plan view of a game sled constructed according to the instant invention with a cable extending therefrom being attached to a fixed object.

Turning now to the drawings, and initially to FIG. 1, a game sled constructed according to the instant invention is shown generally at 10. Sled 10 includes a game-carrying box 12 having a handle 14 attached thereto.

Figure 2:
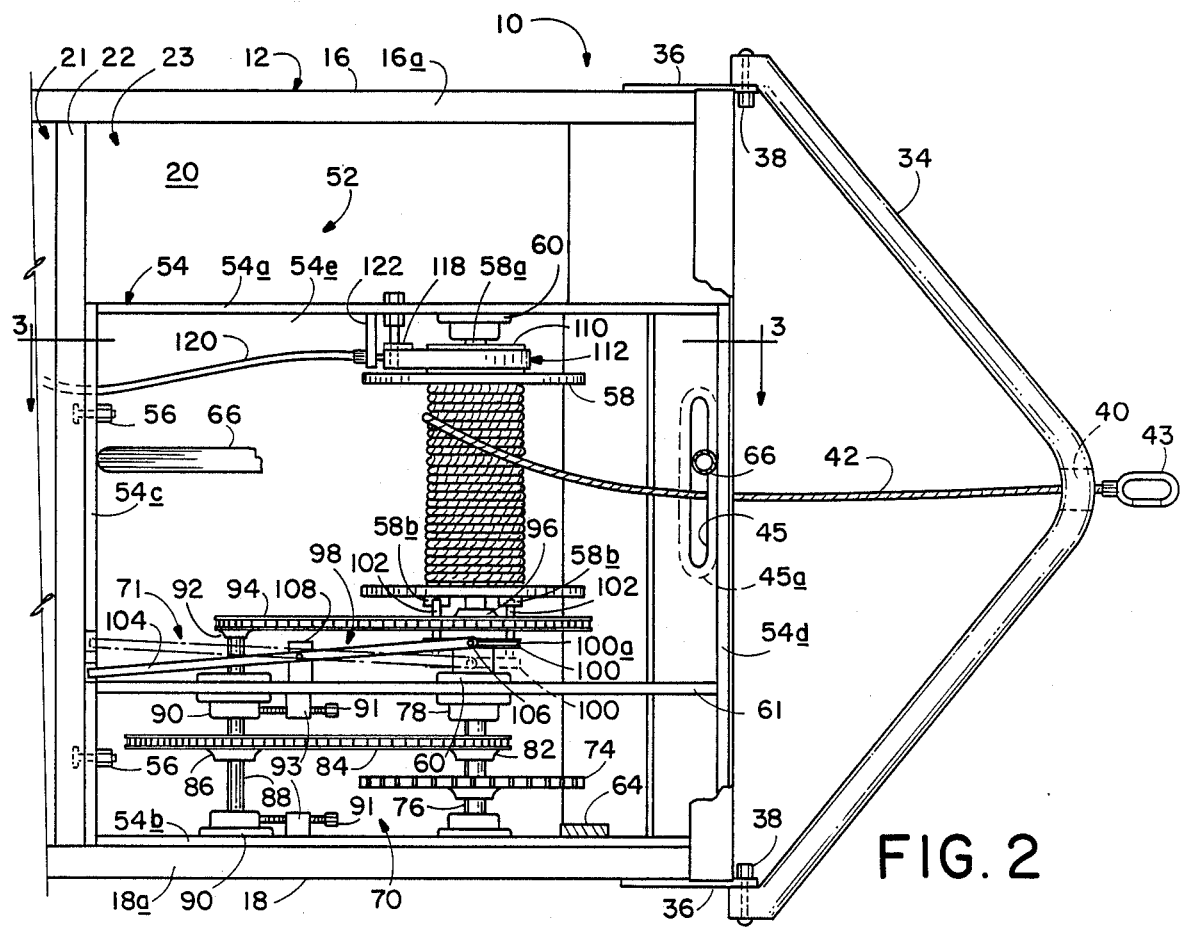
FIG. 2 is an enlarged top plan view of the game sled of the instant invention, with portions broken away to show detail.
Figure 3:
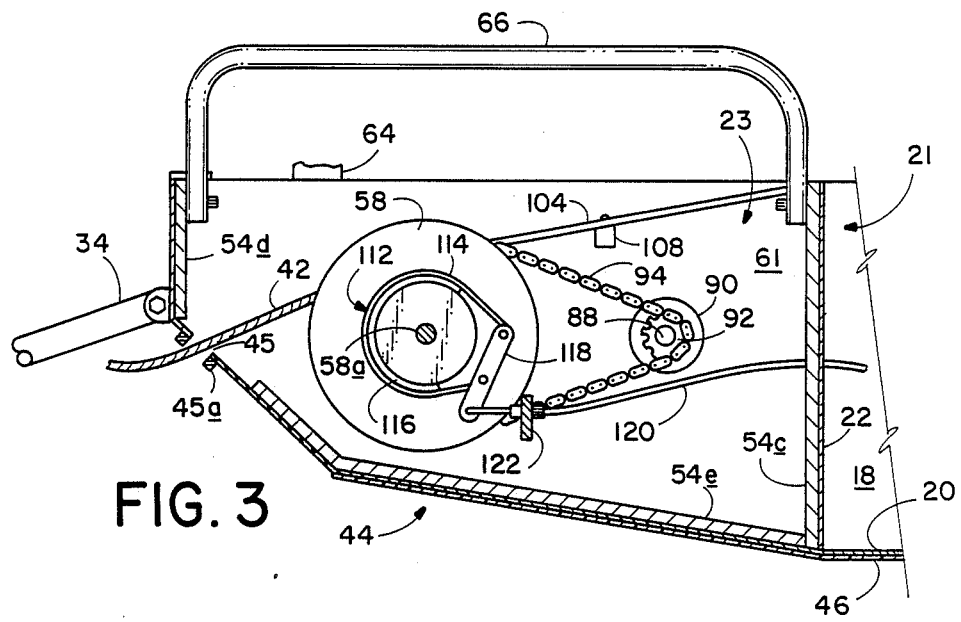
FIG. 3 is a sectional side view of a winch constructed according to the invention, taken generally along line 3—3 of FIG. 2.

Box 12, and now referring to FIGS. 1 and 2, has a pair of spaced apart, substantially parallel sides 16, 18, and a substantially planar base 20. In the preferred embodiment, box 12 is formed of 0.090 inch sheet aluminum which is bent at the junction of base 20 and sides 16 and 18 to form the desired configuration of the box. A lip 16a, 18a is turned over at the tops of sides 16 and 18, respectively, to strengthen the sides. A partition 22, also formed of sheet aluminum in the preferred embodiment, is located towards the forward end of box 20 to further strengthen the structure, and to separate a cargo compartment 21 from a winch compartment 23.

The rear end of box 20 is openable to provide easy placement and removal of game in the box. In the preferred embodiment, a rear panel 24 has a pair of hook-like flanges 24a located at either side thereof which lock over pins 26 to secure panel 24 to the rear of box 12. Flanges 24a and pins 26 comprise what is referred to herein as means for securing rear panel 24 to box 20.

Handle 14 includes a pair of upright supports 28 which are fixed at their bases to sides 16 and 18 and at their tops to a control bar 30, extending between supports 28 and which may be grasped by the operator to direct and control sled 10. A pair of diagonal braces 32 extend forward and downward from control bar 30 and are secured to sides 16 and 18 aft of partition 22. In the preferred embodiment, supports 28, control 30 and braces 32 are formed of square aluminum tubing.

A fairlead 34 is attached to brackets 36 on either side of the front end of box 12. Fairlead 34 is a substantially V-shaped structure and, in the preferred embodiment, is formed of round tubing. The free ends of fairlead 34 are attached to brackets 36 by pins 38 which are operable to allow vertical swinging or pivoting of the apex of the V about pins 38. A cable guide or cable guide means 40 is provided at the apex of the V and is operable to guide a cable 42 as the cable is drawn into the sled. Cable 42 has a free end which terminates in an eye 43.

Sled 10 may be thought of as having a streamline forward end with fairlead 34 forming a V-shaped portion thereof. Although the fairlead as shown and described is operable to guide the sled over and around obstacles which may be in the sled's path, the fairlead could be further enclosed with a sheath to provide even greater obstacle clearing capabilities.

To complete the description of box 12, the box has an upturned forward end, shown generally at 44, to facilitate forward movement of the sled over a surface. An elongate slot 45 is formed in the center of end 44 substantially parallel to base 20 to allow passage of cable 42 therethrough. Slot 45 is surrounded by a slot reinforcement member 45a, which, in the preferred embodiment is a piece of 3/16 inch steel plate.

Sled 10 is provided with friction reduction means to further facilitate sliding of the sled over a surface. In the preferred embodiment, friction reduction means takes the form of a layer or sheet of ultra high molecular weight (UHMW) polyethylene 46 which is affixed to the lower surface of base 20. Sheet 46 is able to withstand abrasions from rocks, limbs, etc., as the sled is pulled over the ground. UHMW polyethylene greatly reduces the coefficient of friction between the base of the sled and the surface and facilitates the drawing of the sled over a surface when the sled is loaded with game.

To further facilitate handling of the sled, an axle 48 may be provided. Axle 48 extends across the width of the sled through sides 16 and 18 and is removable from the sled. Wheels 50 may be attached on either side of axle 48 for rolling the sled over a surface. The axle and wheels or wheel means, are removable, or may be retractable, such that the sled may be brought to rest completely on base 20. Although wheels 50 are operable to facilitate movement of the sled, they are generally used when the sled is in an unloaded condition. The wheels are also useful when it is necessary to move the sled on a paved or extremely rough surface, where the surface would cause substantial damage to the layer of UHMW polyethylene on the bottom of the sled.

A winch, shown generally at 52 is provided for drawing box 12 over a surface. Winch 52 includes, in the preferred embodiment, a winch frame 54 which includes sides 54a 54b, a rear plate 54c, a front plate 54d and a base 54e. A gap is formed between front plate 54d and base 54e to allow passage of cable 42 therethrough. In the preferred embodiment, winch 52 is removable from box 12 and, when placed in the box forward of partition 22, is held in place by nut and bolt combinations 56.

Winch 52 includes a spool 58 which is mounted on bearings 60 and which extends between side 54a and a divider 62. An end of cable 42 is wound on spool 58 and is fixed to spool shaft 58a by a set screw (not shown).

Figure 4:
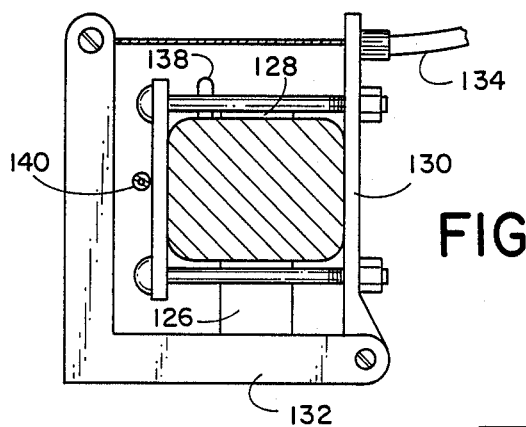
FIG. 4 is an enlarged partial sectional view of a motor throttle assembly, taken generally along line 4—4 of FIG. 1.
Figure 5:
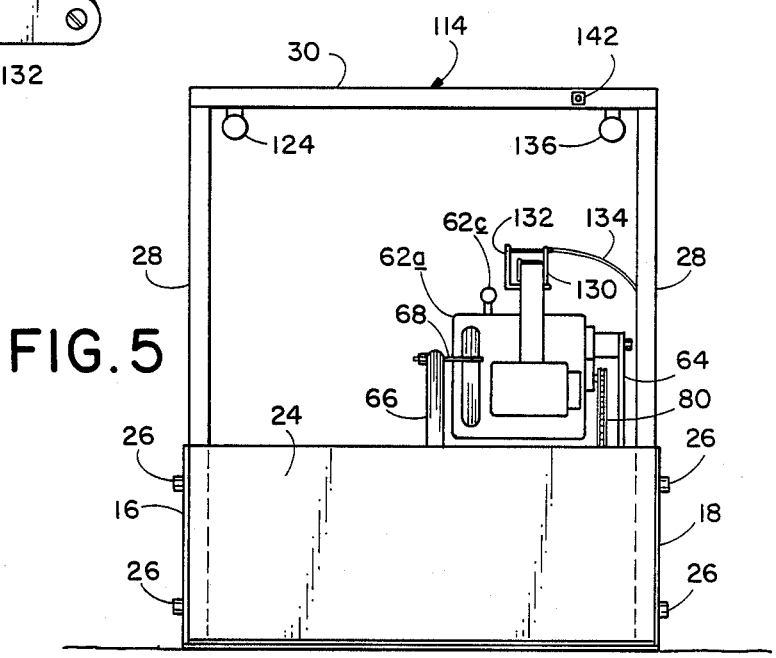
FIG. 5 is an end view of the game sled, taken generally along line 5—5 of FIG. 1.

Referring now to FIGS. 1, 4 and 5, winch 52 is powered by a motor 62 which is of the type normally provided with a small chain saw. Winch 52 includes motor mounting means 64 which is secured to side 54b of winch frame 54 and which is constructed and arranged to cooperate with the normal chain bar mount found on motor 62 to secure motor 62 to winch 52. A generally U-shaped bracket 66 is pivotably secured between plate 54c and plate 54d and may be swung into place opposite motor grip 62a and secured to the grip by a U-bolt 68. This arrangement provides additional support for motor 62 and reduces vibration when the motor in running.

Referring now to FIGS. 1 and 2, power transmission means, shown generally at 70 are provided for selectively coupling spool 58 to motor 62. Power transmission means in the preferred embodiment includes a gear reduction unit, shown generally at 71, including a gear 72 which is connected to a power output shaft 62b of motor 62 and which is then connected to a larger sprocket 74. Sprocket 74 is mounted on a shaft 76 which in turn is bearing mounted between side 54b and divider 61 on bearings 78. Gear 74 is driven by chain 80 which extends between gear 72 and gear 74. Gear 74 is keyed or welded to shaft 76, as is a smaller gear 82, which turns with gear 74. A chain 84 connects gear 82 with another gear 86, fixed on a shaft 88 and supported by bearings 90 which are attached to side 54b and divider 61. Gear 92 is fixed to shaft 88 and is driven with gear 86. A chain 94 connects gear 92 with a large gear 96. Gear 96 is freely rotatable on spool shaft 58a. In the preferred embodiment, large gears 74 and 86 have 72 teeth and gear 96 has 50 teeth. Small gear 82 has 11 teeth and gear 92 has 10 teeth. Chains 80 and 84 are #35 bicycle link while chain 94 is #40 link.

Tension on chains 84 and 94 may be adjusted by sliding bearings 90 and shaft 88 in a slot (not shown) formed in divider 61 and side 54b. Bearings 90 are held in place by set screws 91 which are mounted in blocks 93.

Power transmission means further includes a selective coupler, shown generally at 98 which is operable to connect the gear reduction unit thus far described to spool 58. Coupler 98 includes a disc 100 which is slidable on shaft 58a and has pins 102 mounted on a side thereof. Pins 102 coact with bores 96a, formed in gear 96, and stops 58b, formed on spool 58, thereby engaging spool 58 to motor 62 through power transmission means 70. Disc 100 has a groove 100a extending about the periphery thereof and is shifted by a shifting lever 104 between an engaged position, shown in FIG. 2, and a disengaged position, shown by phantom lines in FIG. 2. Lever 104 has a pin 106 which engages groove 100a to cause shifting of disc 100 between an engaged and disengaged position. Lever 104 is pivoted on a lever mount 108. Disc 100 is retained in either its engaged or disengaged position by lever 104 which locks in either of two indents in plate 54c.

Winch 52 additionally includes a brake drum 110 which is fixed to spool 58 and which is surrounded by a strap brake 112. Strap brake 112 includes a metal band 114 having a lining 116 fixed to the inner surface thereof and contacting the outer surface of drum 110. A brake lever 118 is operable to tighten band 114 and lining 116 about drum 110, thereby preventing rotation of drum 110 and consequently spool 58. Remote operation of brake lever 118 is provided by a cable 120 which is attached to lever 118. Cable 120 is secured to block 122 and extends rearward to control bar 30. Control knob 124 (FIG. 5) is located at the end of cable 120 adjacent control bar 30 and is of the locking type, enabling the operator to lock spool 58 from control bar 30.

Referring now to FIGS. 1 and 4, motor 62 is controlled by a conventional trigger throttle. Many chain saw motors have a safety lock 128 which must be depressed prior to operating throttle 126. A bracket 130 is provided which clamps to the handle of motor 62. Bracket 130 is constructed to depress safety lock 128 when it is attached to motor 62. A throttle activator 132 is pivotally attached to bracket 130 and is operable to depress trigger throttle 126. A throttle cable 134 is secured to bracket 130 and extends rearward to control bar 30. Remote throttle 136 (FIG. 5) is affixed to control bar 30 and allows operation of motor 62 from the rear of sled 10.

Motor 62 also includes a kill switch 138 which is selectively operable to disable motor 62. Motor 62 may be modified by disconnecting kill switch 138 from the wires running thereto, and extending wires 140 rearward to control bar 30 where a remote kill switch 142 is located.

To operate winch 52, a length of cable 42 must be played off of spool 58, through a slot 45. Disc 100 must be in its disengaged position such that pins 102 are removed from the bores in gear 96. Cable is threaded through the opening between plate 54d and base 54e of winch 52, through slot 45 and then through cable guide 40. The cable is drawn off of spool 58 and secured to a suitable stationary object, such as tree 144, shown in FIG. 1. A shackle 146 is secured to eye 43 at the end of cable 42 and then to a stretch of cable 42, completing the connection about tree 144. In the preferred embodiment, a shackle is preferred to a hook in that the shackle will provide a positive attachment of cable 42 about tree 144, whereas a hook may slip off of the cable, should the cable become slack, as when the sled slides down an incline.

Once the cable has been secured to a stationary object, motor 62 is started and allowed to run at an idle. In this condition, the normal centrifugal clutch provided with motor 62 does not turn sprocket 72. Shifting lever 104 is moved such that disk 100 engages gear 96, thereby connecting motor 62 to spool 58 through power transmission means 70. Although it would certainly be possible to remotely engage and disengage selective coupler 98, such remote control has not been provided in the preferred embodiment.

Once motor 62 has been started and selective coupler 98 engaged, the hunter may move to the rear of the sled, release brake 112 and throttle up motor 62 by remote throttle 136. Motor 62 will drive spool 58 drawing in cable 42, thus drawing sled 10 across the ground. Winch 52 is geared such that a speed of between 1 and 4 miles per hour may be maintained, depending upon the speed at which motor 62 is operated. The primary use of sled 10 is to facilitate removal of game from rugged terrain and the speeds selected for sled operation are believed to be most suitable for removing game from such terrain. Motor 62 should have a power rating of 2-3 h.p. for use with power transmission means described herein.

Once the sled reaches the object to which cable 42 is attached, motor 62 is throttled down, brake 112 is set, and motor 62 is turned off with kill switch 142. Once motor 62 has stopped, the kill switch is returned to its run position ready for the next start.

The hunter then moves to the front of the sled, disengaging selective coupler 98, releasing brake 112 and disconnecting cable 42 from the object to which it is attached. The cable is then run out to another object to which it is attached. In the preferred embodiment, spool 58 is provided with approximately 100 yards of 3/16 inch aircraft cable, which again is felt to be an adequate length considering the terrain in which the sled would generally be used.

The operation is repeated as many times as necessary to remove the game from the point of kill to camp or the hunter's vehicle. An important feature of the sled is the V-shaped fairlead which is vertically swingable at the front of the sled. As the fairlead encounters brush, rocks, downed trees, etc., the V-shape of the fairlead acts as a plow, to guide the sled around obstacles. If it is necessary to go over an obstacle, the hinged relationship of the fairlead to the remainder of the sled allows the fairlead to swing up or down, as shown by the phantom lines in FIG. 1, thereby serving to lift the front of the sled over an obstacle and then guide the sled once the obstacle has been mounted. The enclosed sides of the sled and the sheet of UHMW polyethylene on the base of the sled provide a "slick" sled which easily moves through brush without allowing brush to become involved in the mechanisms of the sled. To this end, a winch cover 148 (shown in phantom in FIG. 1) is provided to prevent the introduction of limbs, leaves, hands, and other unwanted material into the workings of the winch, particularly the power transmission means.

The arrangement of handle 14 is such that a smooth line is provided between diagonal braces 32 and control bar 30 so that any limbs which may cross the upwardly extended plane of sides 16 or 18 are moved up and over control bar 30. Additionally, the arrangement of the remote controls on control bar 30 are such that they are not likely to be shifted from their desired positions by obstacles which the sled may encounter.

To explain the loading of game sled 10, the sled is positioned in the field at a point of kill. Depending on the size of the game, the game may be lifted into box 12 over one of the sides, or, if the game is sufficiently large that such lifting is not feasible, rear panel 24 may be removed and the game pulled into the rear compartment of box 12. Winch 52 may be used to assist the hunter in pulling the game into the rear compartment of box 12 in that cable 42 may be drawn directly off of spool 58 towards the rear of box 12 and attached to the game. Motor 62 is then started by pulling starter handle 62 c, and engaging coupler 98, thereby winding cable 42 onto spool 58 and drawing the game into the rear of box 12.

Thus a game sled has been disclosed with is easily operable to remove game from a point of kill to the hunter's camp or vehicle. The sled features a streamline, swingable fairlead which acts to clear the sled around obstacles which are in its path. The game may be easily introduced into the sled and removed from the sled through an openable rear end thereof. Additionally, a powered winch which is used to move the sled over the ground is also operable to assist the hunter in placing game in the sled and removing game from the sled.

Although a preferred embodiment of the invention has been disclosed, it should be appreciated that variations and modifications may be made thereto without departing from the spirit of the invention.

It is claimed and desired to be secured by Letters Patent:

1. A game sled comprising:
   an elongate, game carrying box having spaced apart, substantially parallel sides, a planar base, and an upturned forward end;
   a powered winch including a spool having a length of cable wound thereon, said winch being mounted in said box for drawing the box over a surface; and
   a V-shaped fairlead having the free ends thereof pivotably attached to said box outboard of the sides thereof adjacent said forward end, including a cable guide located at the apex of the V for training said cable therethrough, said apex being vertically swingable, said fairlead being operable to guide the forward end of said box over and around obstacles when same is drawn forward by said winch.

2. The sled of claim 1 wherein said winch includes means for removably mounting same in said box.

3. The sled of claim 1 wherein said forward end has an elongate slot formed therein extending substantially parallel to the plane of said base, and said cable being trainable through said slot.

4. The sled of claim 1 wherein said winch includes motor mounting means constructed and arranged to cooperate with a chain bar mount on a chain saw engine to mount the engine to the winch.

5. The sled of claim 4 wherein said box includes a control bar mounted adjacent the rear of said box and which further includes remote winch control means mounted on said control bar.

6. The sled of claim 1 wherein friction reduction means is provided to promote sliding of the box over a surface.

7. The sled of claim 6 wherein said friction reduction means includes an ultra high molecular weight polyethylene layer affixed to the lower surface of said base.

8. The sled of claim 1 which includes an open rear end extending between the sides of said box and pins disposed adjacent said rear end on the sides of the box, and which further includes a rear panel which is constructed and arranged to fit over said open rear end, said panel having flanges thereon which are constructed and arranged to engage said pins to secure said rear panel to said box over said open rear end.

9. A game sled in combination with a chain saw motor having a chain bar mount thereon, comprising:
an elongate, game carrying box having an open top and parallel sides, a planar base, and a upturned forward end, and which includes an open rear end extending between the sides of said box, and having pins disposed adjacent said rear end on the sides of the box, which further includes a rear panel which is constructed and arranged to fit over said open rear end, said panel having flanges thereon which are constructed and arranged to engage said pins to secure said rear panel to said box over said open rear end;
a winch including a motor mount constructed and arranged to cooperate with the chain bar mount on the chain saw motor for mounting the motor on the said winch and supplying power thereto, the winch further including a spool having a length of cable wound thereon and power transmission means for selectively coupling said spool to the motor for driving said spool to take in said cable; said winch being mounted at a forward end of said box fully contained within the sides of said box, said winch being operable to load game into the box with the rear end thereof removed; and
a substantially V-shaped fairlead having the free ends thereof attached for vertical swinging to said box outboard of the sides thereof adjacent the forward end thereof, extending across the width of said box, including a cable guide located at the apex of the V, said cable being trained through said cable guide, said fairlead being operable to guide the forward end of said box over and around obstacles when same is drawn forward by said winch.

10. The combination of claim 9 wherein friction reduction means is provided to promote sliding of the box over a surface.

11. The combination of claim 10 wherein said friction reduction means includes a sheet of ultra high molecular weight polyethylene affixed to the lower surface of said base.

12. The combination of claim 9 wherein said box includes a control bar mounted adjacent the rear end of said box and which further includes remote winch control means mounted on said control bar.

13. The combination of claim 9 which further includes wheeled means attachable to said box for facilitating movement thereof.

14. The combination of claim 9 which includes means for removably mounting said winch in said box.

15. A game sled comprising:
an elongate game carrying box having spaced apart, substantially parallel sides, a planar base, an open top, a streamlined forward end and an open rear end, a rear panel removably secured in said open rear end and means for securing said rear panel in said rear end; said streamlined forward end including V-shaped portion, having cable guide means at the apex of the V operable to guide said cable onto said spool and guide said box over and around obstacles as the box is drawn over a surface;
a powered winch including a spool having a length of cable wound thereon, said winch being mounted in said box for drawing the box over a surface said winch and said cable being further operated to load game into the box through the rear end thereof when said rear panel is removed.

16. The sled of claim 15 wherein friction reduction means is provided to promote sliding of the box over a surface.

17. The sled of claim 16 wherein said friction reduction means includes an ultra high molecular weight polyethylene layer affixed to the lower surface of said base.

18. The sled of claim 15 which further includes wheeled means attachable to said box for facilitating movement thereof.

* * * * *